(12) United States Patent
Woo et al.

(10) Patent No.: US 9,377,743 B2
(45) Date of Patent: Jun. 28, 2016

(54) POWER TRANSMITTING DEVICE AND IMAGE FORMING APPARATUS HAVING THE SAME

(71) Applicant: SAMSUNG ELECTRONICS CO., LTD., Suwon-si, Gyeonggi-do (KR)

(72) Inventors: Sang Bum Woo, Yongin-si (KR); Soo Yong Kim, Suwon-si (KR); Chang Yong Sung, Busan (KR); Jae Il Yu, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/526,806

(22) Filed: Oct. 29, 2014

(65) Prior Publication Data

US 2015/0125182 A1  May 7, 2015

(30) Foreign Application Priority Data

Nov. 1, 2013  (KR) .......................... 10-2013-0132499

(51) Int. Cl.
| | |
|---|---|
| *G03G 15/00* | (2006.01) |
| *H02K 7/116* | (2006.01) |
| *F16D 1/06* | (2006.01) |
| *H02K 7/14* | (2006.01) |
| *F16D 1/10* | (2006.01) |

(52) U.S. Cl.
CPC ................ *G03G 15/757* (2013.01); *F16D 1/06* (2013.01); *F16D 1/101* (2013.01); *H02K 7/116* (2013.01); *H02K 7/14* (2013.01); *F16D 2001/102* (2013.01); *F16D 2001/103* (2013.01); *H02K 2213/03* (2013.01); *Y10T 403/70* (2015.01)

(58) Field of Classification Search
CPC ......... F16D 1/06; F16D 1/101; G03G 15/757; G03G 21/1647; G03G 21/1857; G03G 21/186; G03G 2221/1657; G03G 15/1615; G03G 21/1671; H02K 7/116; F16H 7/02
USPC .......................................... 399/167; 74/421 R
See application file for complete search history.

(56) References Cited

U.S. PATENT DOCUMENTS

| | | | |
|---|---|---|---|
| 6,240,266 B1 * | 5/2001 | Watanabe ................ | F16D 1/101 399/117 |
| 2003/0059233 A1 * | 3/2003 | Jang ......................... | F16D 1/101 399/167 |
| 2007/0196131 A1 * | 8/2007 | Sato ........................... | F16D 3/04 399/167 |
| 2009/0047040 A1 * | 2/2009 | Nieda ................... | G03G 21/186 399/167 |
| 2012/0243905 A1 * | 9/2012 | Uratani ................. | G03G 21/186 399/111 |

FOREIGN PATENT DOCUMENTS

JP              5471015 B2 *  4/2014

* cited by examiner

*Primary Examiner* — Francis Gray
(74) *Attorney, Agent, or Firm* — Staas & Halsey LLP

(57) ABSTRACT

A power transmitting device having a structure to allow a photoconductor to stably form a visible image on a printing medium. The power transmitting device interconnects a rotator and a drive motor, the drive motor generating drive power to drive the rotator. The power transmitting device includes at least one gear to be rotated upon receiving power from the drive motor, a rotating shaft having one end penetrating the gear and a coupler to interconnect the other end of the rotating shaft and the rotator. An outer diameter of the coupler, an outer diameter of the rotator and an outer diameter of the gear satisfy the following relation: $0.7D1<Dc<D2$, where, D1: outer diameter of the rotator, D2: outer diameter of the gear and Dc: outer diameter of the coupler.

11 Claims, 9 Drawing Sheets

FIG. 6

|       | Kc  | Ks  | Kg  | Kt  | $d\theta/dt$ |
|-------|-----|-----|-----|-----|--------------|
| CASE1 | 210 | 623 | 285 | 101 | 4.3%         |
| CASE2 | 333 | 623 | 285 | 123 | 3.1%         |
| CASE3 | 632 | 623 | 285 | 149 | 2.0%         |

POWER TRANSMITTING DEVICE AND IMAGE FORMING APPARATUS HAVING THE SAME

CROSS-REFERENCE TO RELATED APPLICATIONS

This application claims the benefit of Korean Patent Application No. 10-2013-0132499, filed on Nov. 1, 2013 in the Korean Intellectual Property Office, the disclosure of which is incorporated herein by reference.

BACKGROUND

1. Field

Embodiments of the present disclosure relate to a power transmitting device to transmit power and an image forming apparatus having the same.

2. Description of the Related Art

Image forming apparatuses are devised to print an image on a printing medium. Examples of image forming apparatuses include printers, copiers, fax machines and devices combining functions thereof.

In operation of an electrophotographic image forming apparatus, after light is emitted to a photoconductor charged with a predetermined potential to form an electrostatic latent image on a surface of the photoconductor, toner is fed to the electrostatic latent image to form a visible image. The visible image formed on the photoconductor is directly transferred to a printing medium or indirectly transferred to the printing medium by way of an intermediate transfer body and, then, the visible image transferred to the printing medium is fixed to the printing medium while passing through a fixing device.

To allow the toner image on the photoconductor to be transferred to the printing medium, the photoconductor defines a transfer nip in contact with a transfer roller. Torsion of the photoconductor may occur by shock applied when the printing medium approaching the transfer nip comes into contact with the photoconductor or while the printing medium passes through the transfer nip. Torsion of the photoconductor may vary a position where light reaches the photoconductor, causing a defect in a visible image transferred to the printing medium. This results in deterioration of print quality.

SUMMARY

It is an aspect to provide a power transmitting device having an improved structure to allow a photoconductor to stably form a visible image on a printing medium and an image forming apparatus having the same.

Additional aspects of the disclosure will be set forth in part in the description which follows and, in part, will be apparent from the description, or may be learned by practice of the disclosure.

In accordance with one aspect of the disclosure, a power transmitting device to interconnect a rotator and a drive motor, the drive motor generating drive power to drive the rotator, includes at least one gear to be rotated upon receiving power from the drive motor, a rotating shaft having one end penetrating the gear, and a coupler to interconnect the other end of the rotating shaft and the rotator, wherein an outer diameter of the coupler, an outer diameter of the rotator and an outer diameter of the gear satisfy the following relation: $0.7 D1 < Dc < D2$, where D1: outer diameter of the rotator, D2: outer diameter of the gear and Dc: outer diameter of the coupler.

Torsional rigidity of the coupler may be greater than about 632 kNm/rad.

Torsional rigidity of the power transmitting device may be greater than about 149 kNm/rad.

In accordance with another aspect of the disclosure, an image forming apparatus includes a photoconductor, an electrostatic latent image being formed on the photoconductor, a drive unit to drive the photoconductor, and a power transmitting unit to transmit power from the drive unit to the photoconductor, wherein the power transmitting unit includes at least one gear connected to and rotated by the drive unit, a rotating shaft having one end connected to the gear so as to be rotated by the gear, and a coupler to interconnect the other end of the rotating shaft and the photoconductor, and wherein the coupler has an outer diameter greater than about 21.5 mm and less than about 120 mm.

The outer diameter of the coupler may be substantially equal to or greater than an outer diameter of the photoconductor.

The photoconductor may include a flange formed at one end thereof so as to be connected to the coupler, and the flange may include a receiving portion for reception of at least a portion of the coupler.

The coupler may include a plurality of coupling protrusions extending from one side of the coupler in a given direction for coupling of the coupler and the photoconductor.

The receiving portion may be shaped such that a diameter thereof is gradually reduced in an axial direction inward of the photoconductor, the coupler may include a coupling portion to be received and coupled in the receiving portion, and the coupling portion may be shaped such that a diameter thereof is gradually reduced in a given direction for coupling of the coupler and the photoconductor, so as to correspond to the receiving portion.

The flange may include a plurality of first coupling protrusions extending radially outward of the photoconductor and a plurality of first coupling recesses formed between the first coupling protrusions, and the coupler may include a plurality of second coupling protrusions to be inserted into the first coupling recesses and a plurality of second coupling recesses for reception of the first coupling protrusions.

The second coupling protrusions may be spaced apart from one another in a circumferential direction of the coupler.

In accordance with a further aspect of the disclosure, an image forming apparatus includes a first rotator, a second rotator to apply pressure to the first rotator to define a nip, a drive unit to drive the first rotator, and a power transmitting unit to transmit power from the drive unit to the first rotator, wherein torsional rigidity of the power transmitting unit is greater than about 632 kNm/rad such that a torsion angle variation rate of the first rotator, due to shock applied to the first rotator by a printing medium when the printing medium passes through the nip, becomes less than 2°.

The drive unit may include a drive motor, a drive shaft and a driving gear connected to the drive shaft, and the power transmitting unit may include a driven gear engaged with and rotated by the driving gear, a rotating shaft having one end connected to the driven gear so as be rotated by the driven gear and a coupler having one side coupled to the other end of the rotating shaft and the other side coupled to one end of the first rotator.

The coupler may have an outer diameter substantially equal to an outer diameter of the first rotator.

The photoconductor may include a flange formed at one end thereof so as to be connected to the coupler, and the flange may include a receiving portion for reception of at least a portion of the coupler, the receiving portion being shaped such that a diameter thereof is gradually reduced in an axial direction inward of the photoconductor. The coupler may include a coupling portion to be received and coupled in the receiving portion, and the coupling portion may be shaped such that a diameter thereof is gradually reduced in a given direction for coupling of the coupler and the photoconductor, so as to correspond to the receiving portion.

The coupler may have an outer diameter greater than an outer diameter of the first rotator and less than an outer diameter of the driven gear.

The flange may include a plurality of first coupling protrusions extending radially outward of the photoconductor and a plurality of first coupling recesses formed between the first coupling protrusions, and the coupler may include a plurality of second coupling protrusions to be inserted into the first coupling recesses and a plurality of second coupling recesses for reception of the first coupling protrusions.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a table showing a relationship between torsional rigidity of a driven gear, a rotating shaft, a coupler and a power transmitting unit and a torsion angle variation rate of a photoconductor;

DETAILED DESCRIPTION

Figure 1:
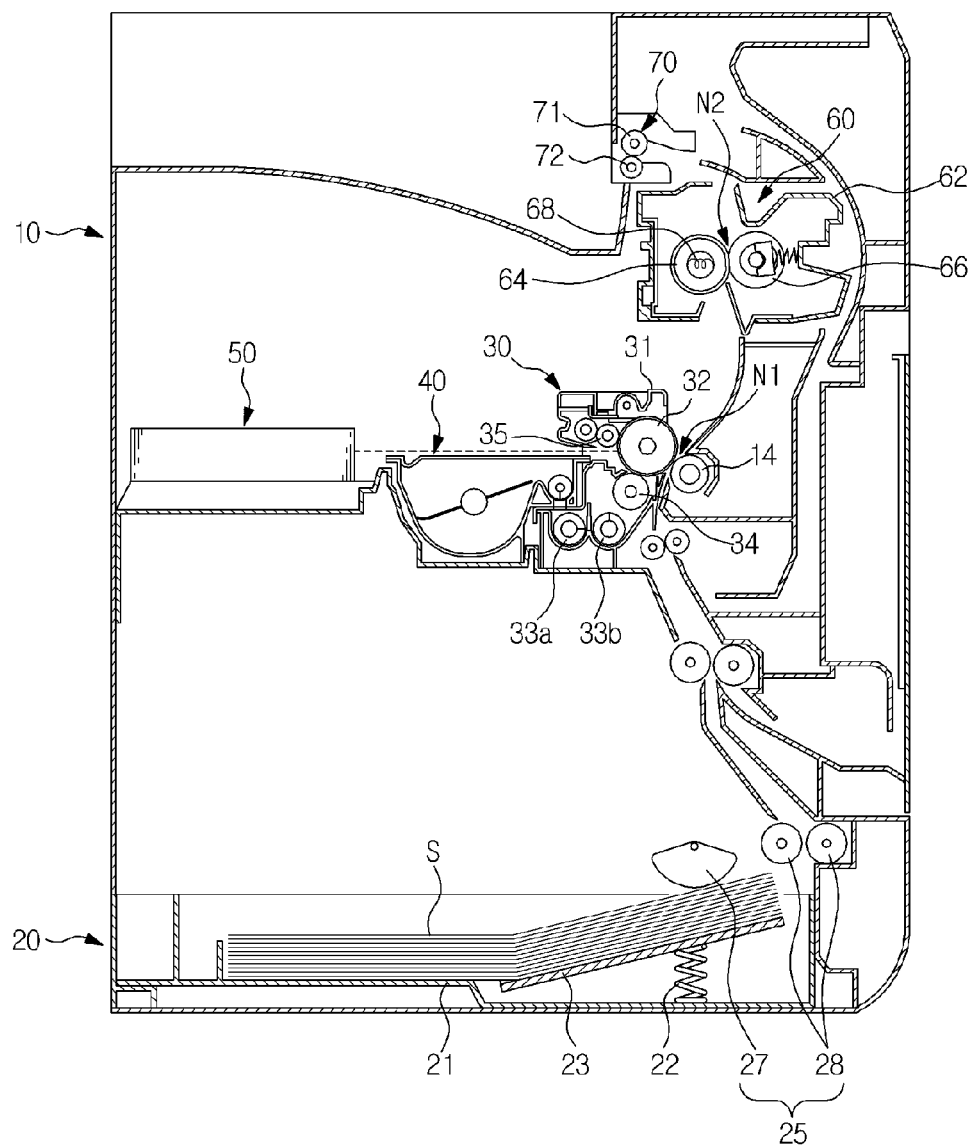
FIG. 1 is a view showing a configuration of an image forming apparatus according to one embodiment of the present disclosure.

Hereinafter, embodiments of the present disclosure will be described in detail with reference to the accompanying drawings. FIG. 1 is a view showing a configuration of an image forming apparatus according to one embodiment of the present disclosure.

As exemplarily shown in FIG. 1, the image forming apparatus 1 includes a main body 10, a paper feed device 20 for storage and rapid feeding of a printing medium S, a developing device 30 to form an image on a printing medium S fed by the paper feed device 20, a toner device 40 to feed toner to the developing device 30, a light scan device 50 to form an electrostatic latent image on a photoconductor 32 of the developing device 30, a fixing device 60 to fix a toner image, transferred to the printing medium S, on the printing medium S, and a discharge device 70 to discharge the printing medium S, on which the image has been completely formed, to the outside of the main body 10.

The paper feed device 20 serves to store and to rapidly feed the printing medium S. The paper feed device 20 is located in a lower region of the main body 10 to feed the printing medium S to the developing device 30.

The paper feed device 20 may include a paper feed tray 21 in the form of a cassette that may be drawn from the main body 10 upon storage of the printing medium S and a delivery member 25 to pick up the printing medium S stored in the paper feed tray 21 one by one and to deliver the printing medium S to the developing device 30.

A knock-up plate 23 may be accommodated in the paper feed tray 21 to guide the loaded printing medium S to the delivery member 25. To this end, one end of the knock-up plate 23 may be rotatably coupled to the paper feed tray 21 and the other end of the knock-up plate 23 may be supported by a pressure spring 22.

The delivery member 25 may include a pickup roller 27 to pick up the printing medium S loaded on the knock-up plate 23 one by one and a feed roller 28 to deliver the printing medium S picked up by the pickup roller 27 to the developing device 30.

The developing device 30 includes a housing 31 forming an external appearance, the photoconductor 32 rotatably mounted in the housing 31 to form an electrostatic latent image, agitator screws 33a and 33b to agitate toner fed from the toner device 40, a developing roller 34 to feed the toner agitated by the agitator screws 33a and 33b to the photoconductor 32 and a charge member 35 to charge the photoconductor 32.

The toner fed from the toner device 40 is introduced into the housing 31 and agitated and moved to one side of the housing 31 by the agitator screws 33a and 33b. Then, the agitated and moved toner is fed to the photoconductor 32 by the developing roller 34 to form a visible image.

To allow the toner fed to the photoconductor 32 for formation of a visible image to be transferred to the printing medium S, the photoconductor 32 comes into contact with a transfer roller 14 to define a transfer nip N1. The transfer roller 14 is rotatably located in the main body 10. The photoconductor 32 may be a rotator that is rotated upon receiving power from a drive unit (110, see FIG. 2) and a power transmitting unit (120, see FIG. 2) that will be described hereinafter.

The toner device 40 is coupled to the developing device 30 and serves to receive and store toner used to form an image on the printing medium S. The toner device 40 feeds toner to the developing device 30 when an image forming operation proceeds.

The light scan device 50 emits light containing image information to the photoconductor 32 to form an electrostatic latent image on the photoconductor 32.

The fixing device 60 includes a housing 62 and a heating member 64 and a pressure member 66 rotatably arranged in the housing 62.

As the printing medium S, to which the toner image has been transferred, passes between the heating member 64 and the pressure member 66, the toner image is fixed to the printing medium S by heat and pressure.

The heating member 64 is rotated in engagement with the pressure member 66 to define a fixing nip N2 in conjunction with the pressure member 66. As such, the heating member 64 is heated by a heat source 68 and transmits heat to the printing medium S passing through the fixing nip N2. The heating member 64 may be a heating roller that is rotated upon receiving power from a drive source (not shown). The heat source 68 is located inside the heating member 64 to apply heat to the printing medium S to which the toner image has been transferred. Although a halogen lamp may be used as the heat source 68, various other devices, such as a hot wire, induction heater or the like, may be used.

The pressure member 66 is located in contact with an outer circumferential surface of the heating member 64 to define the fixing nip N2 between the pressure member 66 and the heating member 64. The heating member 64 may be a pressure roller that is rotated upon receiving power from a drive source (not shown).

The discharge device 70 includes a first discharge roller 71 and a second discharge roller 72 arranged in sequence and serves to discharge the printing medium S, having passed through the fixing device 60, to the outside of the main body 10.

Hereinafter, a power transmission structure for driving of the photoconductor 32 will be described in detail.

Figure 2:
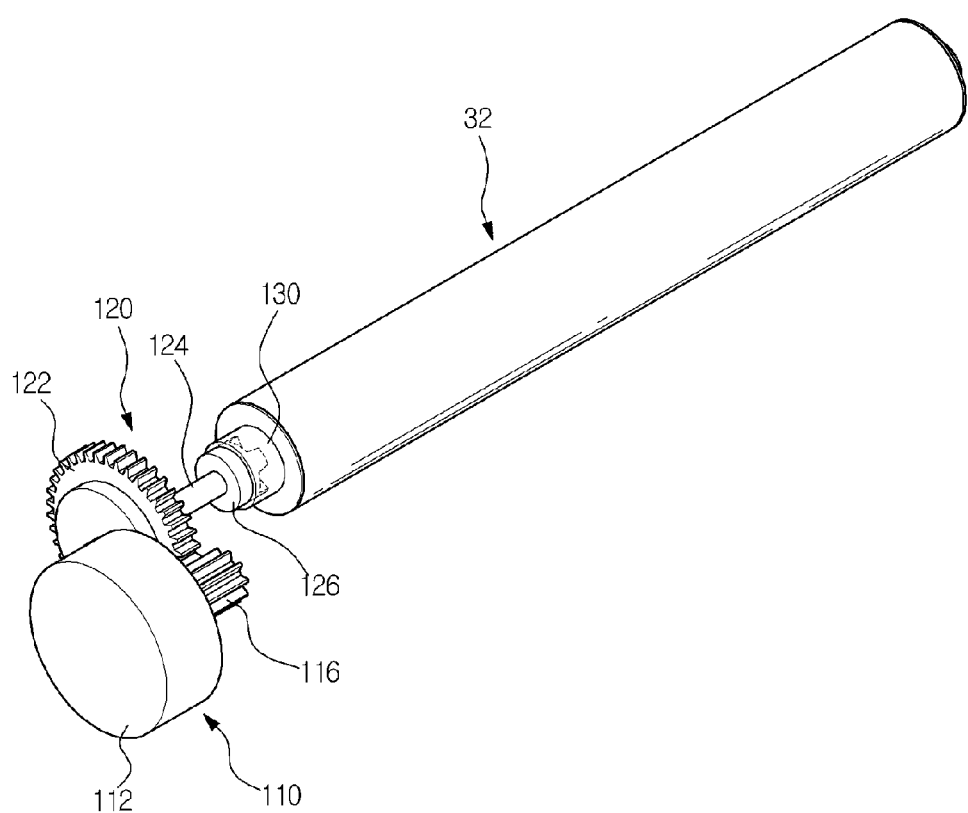
FIG. 2 is a perspective view showing a coupled state of a drive unit, a power transmitting unit and a photoconductor.
Figure 3:
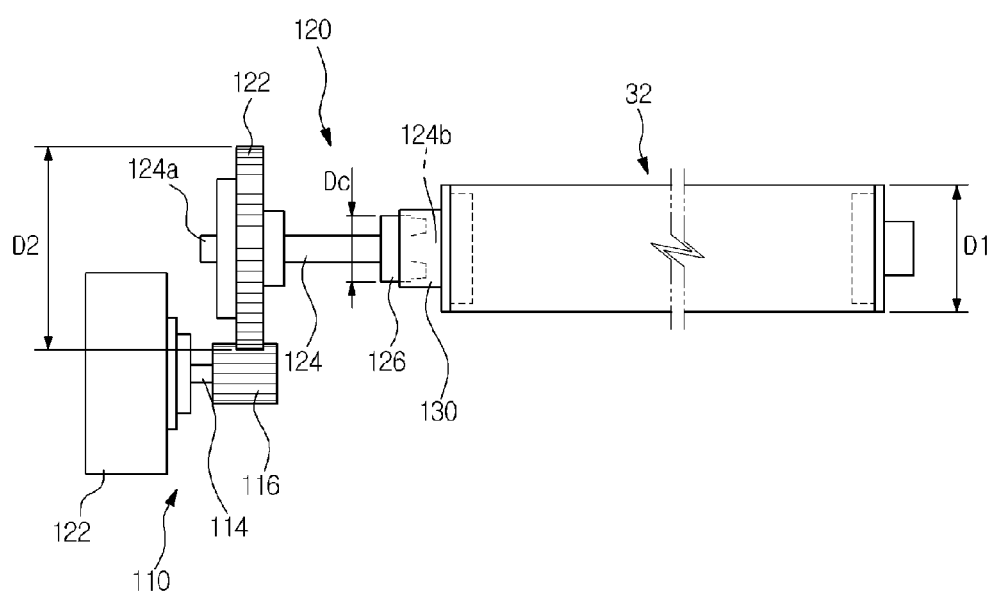
FIG. 3 is a plan view of FIG. 2.
Figure 4:
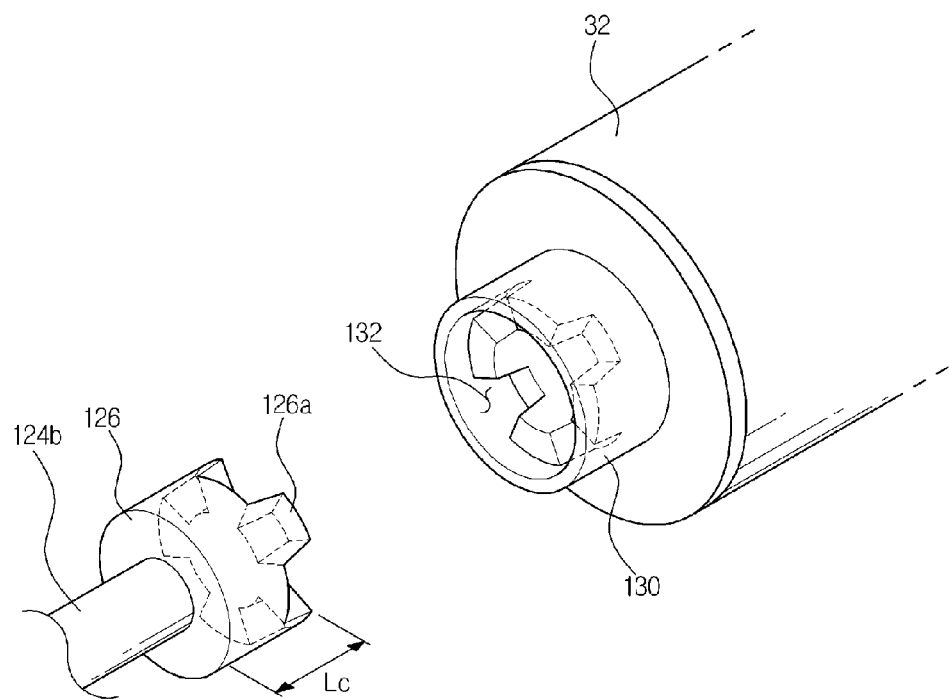
FIG. 4 is a perspective view showing a coupling relationship between a flange and a coupler.

FIG. 2 is a perspective view showing a coupled state of the drive unit, the power transmitting unit and the photoconductor, FIG. 3 is a plan view of FIG. 2 and FIG. 4 is a perspective view showing a coupling relationship between a flange and a coupler.

As exemplarily shown in FIGS. 2 and 3, the image forming apparatus 1 includes the drive unit 110 to drive the photoconductor 32 and the power transmitting unit 120 to transmit power from the drive unit 110 to the photoconductor 32.

The drive unit 110 includes a drive motor 112 to generate drive power, a drive shaft 114 connected to the drive motor 112 and a driving gear 116 connected to the drive shaft 114. The driving gear 116 is designed such that a maximum outer diameter thereof does not exceed 120 mm due to a limited space of the main body 10 in which the drive unit 110 is received.

The power transmitting unit 120 includes a driven gear 122 engaged with and rotated by the driving gear 116, a rotating shaft 124 having one end 124a rotatably connected to the driven gear 122 and a coupler 126 having one side coupled to the other end 124b of the rotating shaft 124 and the other side coupled to one end of the photoconductor 32 to interconnect the rotating shaft 124 and the photoconductor 32.

As exemplarily shown in FIG. 4, the coupler 126 is coupled to a flange 130 provided at one end of the photoconductor 32 to impede rotation thereof relative to the flange 130.

The coupler 126 has a smaller outer diameter Dc than an outer diameter D1 of the photoconductor 32 and includes a plurality of coupling protrusions 126a inserted into the flange 130. The coupling protrusions 126a extend from one side of the coupler 126 in a given direction in which the coupler 126 is coupled to the photoconductor 32. The coupling protrusions 126a are spaced apart from one another in a circumferential direction of the coupler 126.

The flange 130 includes a plurality of receiving portions 132 into which the coupling protrusions 126a may be inserted. The receiving portions 132 are formed from one side of the flange 130 facing one side of the coupler 126 provided with the coupling protrusions 126a in a given direction in which the coupler 126 is coupled to the photoconductor 32. The receiving portions 132 are spaced apart from one another in a circumferential direction of the flange 130 so as to correspond to the coupling protrusions 126a in a one to one ratio.

While the printing medium S approaches or passes through the transfer nip N1 between the photoconductor 32 and the transfer roller 14, torsion of the photoconductor 32 occurs by shock applied to the photoconductor 32. When a torsion angle variation rate of the photoconductor 32 excessively increases, light emitted from the light scan device 50 reaches a position on the photoconductor 32 greatly deviated from a predetermined position, which may cause a defect in a visible image transferred to the printing medium S. Therefore, it may be necessary to control the torsion angle variation rate of the photoconductor 32 to prevent generation of a defect in the visible image transferred to the printing medium S while the printing medium S passes through the transfer nip N1. The principle of controlling the torsion angle variation rate of the photoconductor 32 will be described below.

Figure 5:
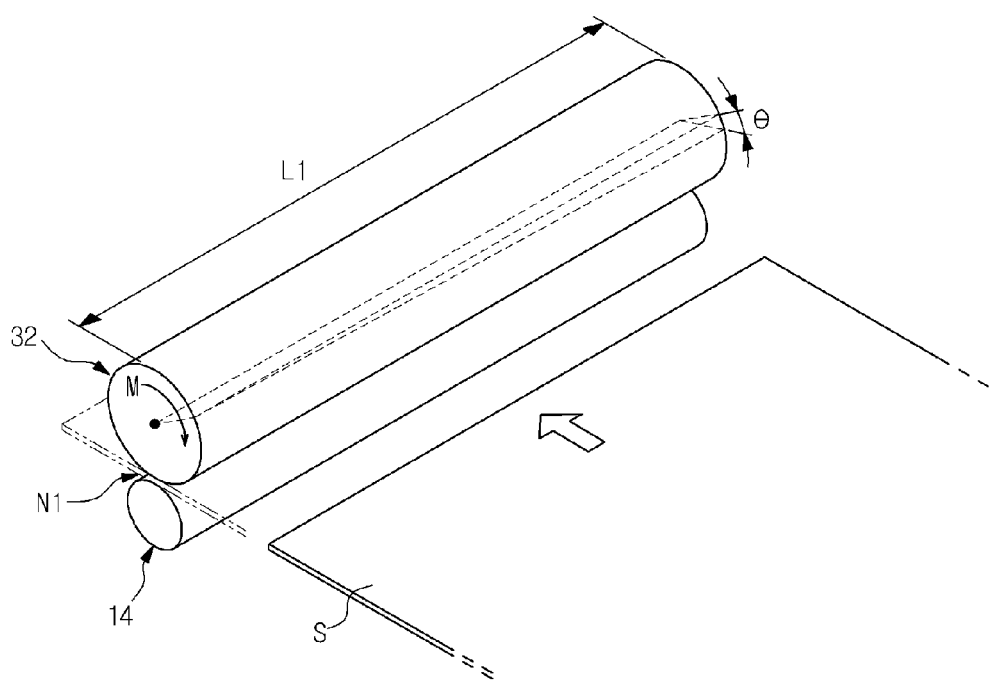
FIG. 5 is a view for explanation of a relationship between a variation rate of torque applied to a photoconductor by a printing medium, torsional rigidity and a torsion angle variation rate.
Figure 7:
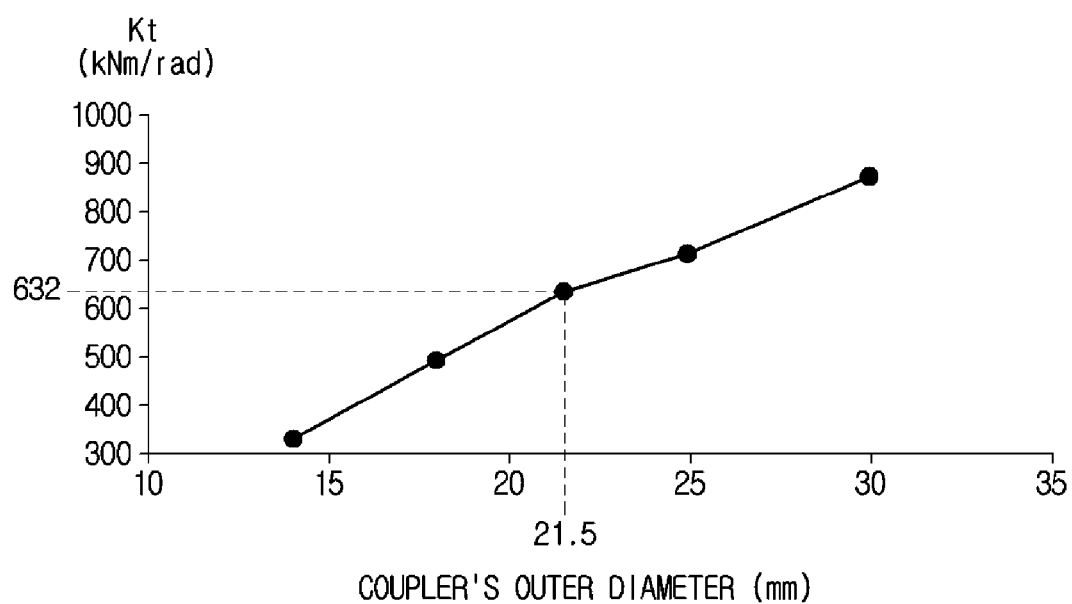
FIG. 7 is a graph showing a relationship between an outer diameter and torsional rigidity of a coupler.

FIG. 5 is a view for explanation of a relationship between a variation rate of torque applied to the photoconductor by the printing medium, torsional rigidity and a torsion angle variation rate, FIG. 6 is a table showing a relationship between torsional rigidity of the driven gear, the rotating shaft, the coupler and the power transmitting unit and a torsion angle variation rate of the photoconductor, and FIG. 7 is a graph showing a relationship between an outer diameter and torsional rigidity of the coupler. FIG. 5 assumes that the photoconductor has an approximately cylindrical shape.

As exemplarily shown in FIG. 5, a relationship between torque M caused by force applied to the photoconductor 32 when the printing medium S enters the transfer nip N1, a torsion angle θ of the photoconductor 32 and torsional rigidity K of the photoconductor 32 and the power transmitting unit 120 that rotatably supports the photoconductor 32 is approximately as follows.

$$M = K \cdot \theta \quad \text{(Equation 1)}$$

Based on Equation 1, a relationship between a variation rate (dM/dt) of torque M caused by force applied to the photoconductor 32 when the printing medium S enters the transfer nip N1 and the torsion angle variation rate (d θ/dt) of the photoconductor 32 is as follows:

$$dM/dt = K \cdot d\theta/dt \quad \text{(Equation 2)}$$

To prevent a defect in the visible image transferred to the printing medium S, it may be necessary to control the torsion angle variation rate (d θ/dt) of the photoconductor 32 to a given numerical value or less. When the torque variation rate dM/dt upon entrance of the printing medium S is constant, it may be necessary to increase the torsional rigidity K of the photoconductor 32 and the power transmitting unit 120 to a given numerical value or more based on Equation 2.

When an outer diameter D1 and a length L1 of the photoconductor 32 are determined, the torsion angle variation rate (d θ/dt) of the photoconductor 32 may be controlled by increasing the torsional rigidity K of the power transmitting unit 120. As described above, since the power transmitting unit 120 includes the driven gear 122, the rotating shaft 124 and the coupler 126, total torsional rigidity Kt of the power transmitting unit 120 is associated with torsional rigidity Kg of the driven gear 122, torsional rigidity Ks of the rotating shaft 124 and torsional rigidity Kc of the coupler 126. A relationship between the total torsional rigidity Kt of the power transmitting unit 120, the torsional rigidity Ks of the rotating shaft 124, the torsional rigidity Kg of the driven gear 122 and the torsional rigidity Kc of the coupler 126 is as follows:

$$1/Kt = 1/Kg + 1/Ks + 1/Kc \quad \text{(Equation 3)}$$

A relationship between the torsional rigidities Kg, Ks, Kc and Kt of the driven gear 122, the rotating shaft 124, the coupler 126 and the power transmitting unit 120 and the torsion angle variation rate (d θ/dt) of the photoconductor 32 may be acquired via Computer Aided Engineering (CAE) analysis and results of such analysis are shown in the table of FIG. 6.

As exemplarily shown in the table, it will be appreciated that greater total torsional rigidity Kt of the power transmitting unit 120 causes smaller torsion angle variation rate (d θ/dt) of the photoconductor 32.

As discovered, no defect occurs in the visible image transferred to the printing medium S when the torsion angle variation rate (d θ/dt) of the photoconductor 32 is below 2%. As shown in the table, the torsion angle variation rate (d θ/dt) of the photoconductor 32 is 2% when the total torsional rigidity Kt of the power transmitting unit 120 is 149 kNm/rad. Thus, it will be appreciated that the total torsional rigidity Kt of the power transmitting unit 120 may need to be above 149 kNm/rad in order to prevent a defect in the visible image transferred to the printing medium S.

As represented in Equation 3, the total torsional rigidity Kt of the power transmitting unit 120 is associated with torsional rigidities of constituent elements of the power transmitting unit 120, i.e. the torsional rigidity Kg of the driven gear 122, the torsional rigidity Ks of the rotating shaft 124 and the torsional rigidity Kc of the coupler 126. Thus, the total torsional rigidity Kt of the power transmitting unit 120 may be adjusted by adjusting any one of the torsional rigidity Kg of the driven gear 122, the torsional rigidity Ks of the rotating shaft 124 and the torsional rigidity Kc of the coupler 126. In the table, when the torsional rigidity Kg of the driven gear 122 and the torsional rigidity Ks of the rotating shaft 124 remain constant and the torsional rigidity Kc of the coupler 126 is increased to 632 kNm/rad, the torsion angle variation rate (d θ/dt) of the photoconductor 32 is reduced to 2.0%. Accordingly, it will be appreciated that the torsional rigidity Kc of the coupler 126 may need to be above 632 kNm/rad in order to prevent a defect in the visible image transferred to the printing medium S. Although not represented in the table, the torsional rigidity Kg of the driven gear 122 or the torsional rigidity Ks of the rotating shaft 124 as well as the torsional rigidity Kc of the coupler 126 may be adjusted to reduce the torsion angle variation rate (d θ/dt) of the photoconductor 32 to be below 2% in order to prevent a defect in the visible image transferred to the printing medium S.

The coupler 126 may have an approximately cylindrical shape and the torsional rigidity Kc of the coupler 126 is defined by the following Equation 4:

$$Kc = G*J/Lc \qquad \text{(Equation 4)}$$

(where, G=a torsional rigidity coefficient, $J=\pi Dc^4/32$, Lc=length of the coupler, Dc=outer diameter of the coupler).

As represented in Equation 4, it will be appreciated that the torsional rigidity Kc of the coupler 126 is associated with the outer diameter Dc of the coupler and the length Lc of the coupler and increasing the outer diameter Dc of the coupler is more effective than reducing the length Lc of the coupler. A relationship between the outer diameter Dc of the coupler and the torsion angle variation rate (d θ/dt) of the photoconductor 32 may be acquired via CAE analysis and results of such analysis are shown in the graph of FIG. 7.

As exemplarily shown in the table of FIG. 6 and the graph of FIG. 7, it will be appreciated that the torsional rigidity Kc of the coupler 126 becomes 632 kNm/rad when the outer diameter Dc of the coupler is 21.5 mm. In addition, since the torsion angle variation rate (d θ/dt) of the photoconductor 32 is 2% when the torsional rigidity Kc of the coupler 126 is 632 kNm/rad, it will be appreciated that the outer diameter Dc of the coupler may need to be above 21.5 mm in order to prevent a defect in the visible image transferred to the printing medium S.

Increasing an outer diameter D2 of the driven gear 122 to 120 mm or more may be impossible due to the fact that the power transmitting unit 120 occupies a limited interior space of the main body 10 and the outer diameter Dc of the coupler may need to be smaller than the outer diameter of the driven gear 122. Therefore, the outer diameter Dc of the coupler may need to be below 120 mm.

As described above, in order to prevent a defect in the visible image transferred to the printing medium S, the torsion angle variation rate (d θ/dt) of the photoconductor 32 may need to be below 2% and, in turn, to secure the torsion angle variation rate (d θ/dt) of the photoconductor 32 below 2%, the total torsional rigidity Kt of the power transmitting unit 120 may need to be above 149 kNm/rad. In addition, to increase the total torsional rigidity Kt of the power transmitting unit 120 beyond 149 kNm/rad when the torsional rigidity Kg of the driven gear 122 and the torsional rigidity Ks of the rotating shaft 124 remain constant, the torsional rigidity Kc of the coupler 126 may need to be above 632 kNm/rad and, in this case, the outer diameter Dc of the coupler may need to be above 21.5 mm.

Hereinafter, alternative embodiments of the flange and the coupler will be described.

Figure 8:
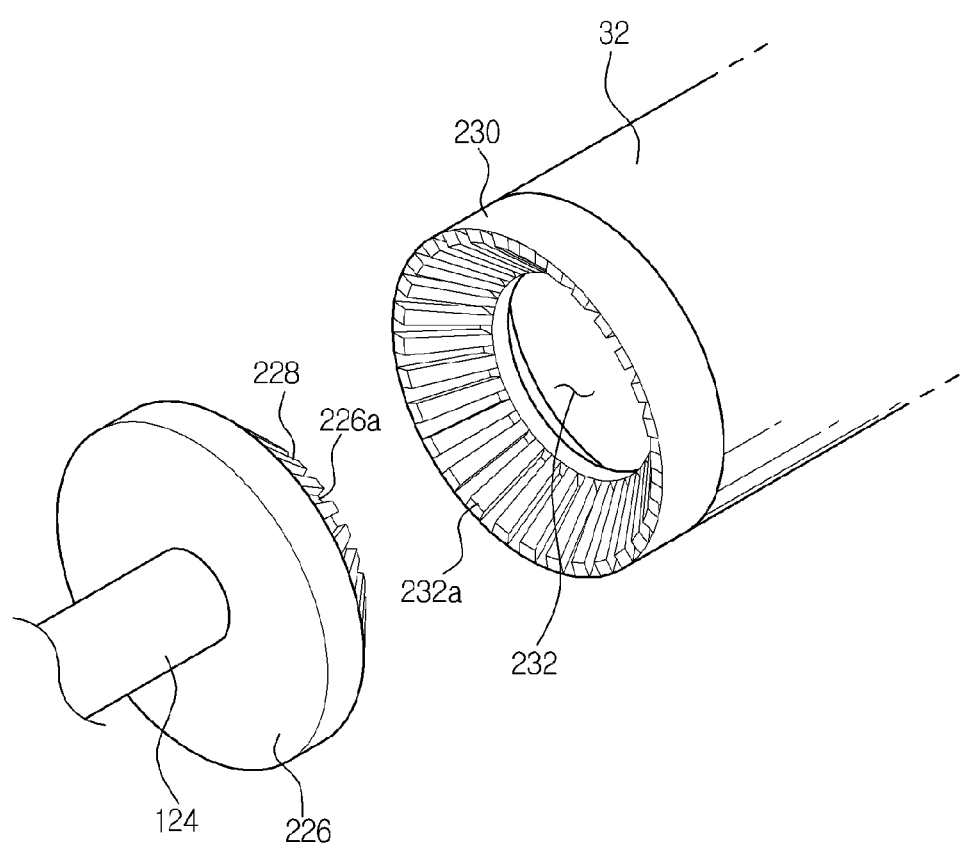
FIG. 8 is a perspective view showing one alternative embodiment of a flange and a coupler.
Figure 9:
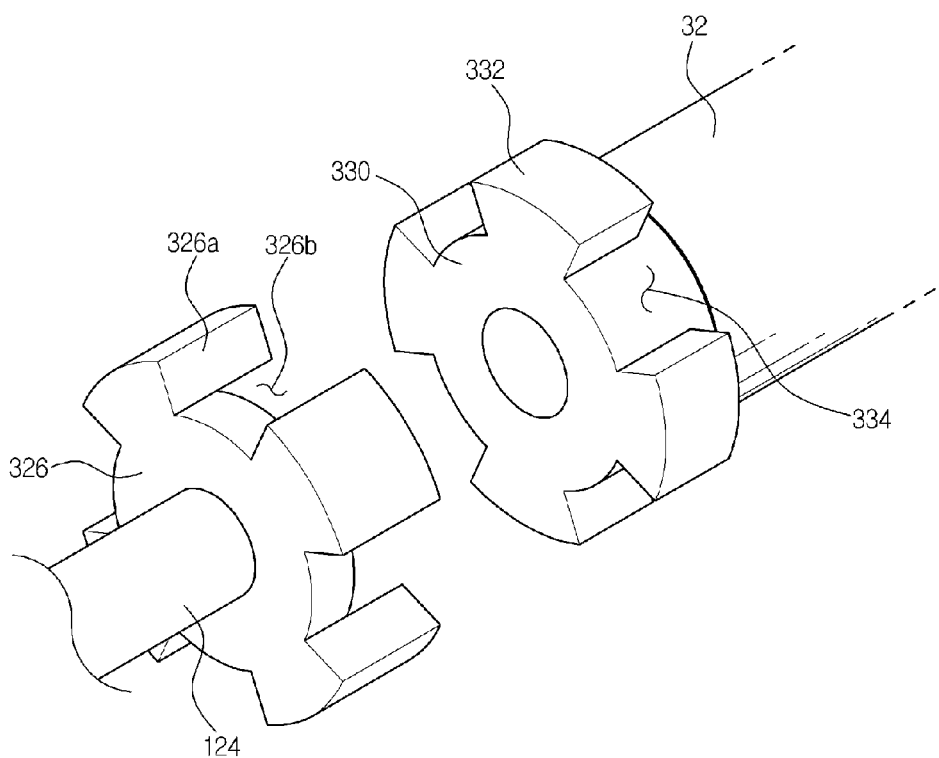
FIG. 9 is a perspective view showing another alternative embodiment of a flange and a coupler.

FIG. 8 is a perspective view showing one alternative embodiment of the flange and the coupler, and FIG. 9 is a perspective view showing another alternative embodiment of the flange and the coupler.

As exemplarily shown in FIG. 8, a flange 230 has a receiving portion 232, a diameter of which is gradually reduced in an axial direction inward of the photoconductor 32.

A coupler 226 has substantially the same diameter as the photoconductor 32 and includes a coupling portion 226a received and coupled in the receiving portion 232. The coupling portion 226a extends from one side of the coupler 226 toward the flange 230. To correspond to the receiving portion 232, the coupling portion 226a is shaped such that a diameter thereof is gradually reduced in a given direction in which the coupler 226 is coupled to the photoconductor 32.

To prevent relative rotation between the flange 230 and the coupler 226 in a state in which the coupling portion 226a is received in the receiving portion 232, fastening gears 228 and 232a to be engaged with each other are formed respectively at an inner surface of the receiving portion 232 and an outer surface of the coupling portion 226a.

As exemplarily shown in FIG. 9, a flange 330 includes a plurality of first coupling protrusions 332 extending radially outward of the photoconductor 32 and a plurality of first coupling recesses 334 formed between the first coupling protrusions 332. The first coupling protrusions 332 and the first coupling recesses 334 are respectively spaced apart from one another in a circumferential direction of the flange 330.

The coupler 326 has a larger diameter than that of the photoconductor 32 and includes a plurality of second coupling protrusions 326a to be inserted into the first coupling recesses 334 and a plurality of second coupling recesses 326b in which the first coupling protrusions 332 are received.

The second coupling protrusions 326a and the second coupling recesses 326b are spaced apart from one another in a circumferential direction of the flange 130 to correspond to the first coupling recesses 334 and the first coupling protrusions 332 respectively.

As is apparent from the above description, according to embodiments of the present disclosure, by improving torsional rigidity of a power transmitting device that interconnects a photoconductor and a drive unit to transmit power, a torsion angle variation rate of the photoconductor may be appropriately controlled, which may prevent a defect in a visible image transferred to a printing medium.

Although the embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An image forming apparatus comprising:
a photoconductor, an electrostatic latent image being formed on the photoconductor;
a drive unit to drive the photoconductor; and
a power transmitting unit to transmit power from the drive unit to the photoconductor,
wherein the power transmitting unit includes
at least one gear connected to and rotated by the drive unit;
a rotating shaft having one end connected to the gear so as to be rotated by the gear; and
a coupler to interconnect the other end of the rotating shaft and the photoconductor,
wherein the coupler has an outer diameter greater than about 21.5 mm and less than about 120 mm, and
the outer diameter of the coupler is substantially equal to or greater than an outer diameter of the photoconductor.

2. An image forming apparatus comprising:
a photoconductor, an electrostatic latent image being formed on the photoconductor;
a drive unit to drive the photoconductor; and
a power transmitting unit to transmit power from the drive unit to the photoconductor,
wherein the power transmitting unit includes at least one gear connected to and rotated by the drive unit, a rotating shaft having one end connected to the gear so as to be rotated by the gear, and a coupler to interconnect the other end of the rotating shaft and the photoconductor,
the photoconductor includes a flange formed at one end thereof so as to be connected to the coupler, and
the flange includes a receiving portion for reception of at least a portion of the coupler, the receiving portion being shaped such that a diameter thereof is gradually reduced in an axial direction inward of the photoconductor,
the coupler includes a coupling portion to be received and coupled in the receiving portion, and
the coupling portion is shaped such that a diameter thereof is gradually reduced in a given direction for coupling of the coupler and the photoconductor, so as to correspond to the receiving portion.

3. The image forming apparatus according to claim 2, wherein the coupler includes a plurality of coupling protrusions extending from one side of the coupler in a given direction for coupling of the coupler and the photoconductor.

4. An image forming apparatus comprising:
a photoconductor, an electrostatic latent image being formed on the photoconductor;
a drive unit to drive the photoconductor; and
a power transmitting unit to transmit power from the drive unit to the photoconductor,
wherein the power transmitting unit includes at least one gear connected to and rotated by the drive unit, a rotating shaft having one end connected to the gear so as to be rotated by the gear, and a coupler to interconnect the other end of the rotating shaft and the photoconductor,
the photoconductor includes a flange formed at one end thereof so as to be connected to the coupler, and
the flange includes a receiving portion for reception of at least a portion of the coupler,
the flange includes a plurality of first coupling protrusions extending radially outward of the photoconductor and a plurality of first coupling recesses formed between the first coupling protrusions, and
the coupler includes a plurality of second coupling protrusions to be inserted into the first coupling recesses and a plurality of second coupling recesses for reception of the first coupling protrusions.

5. The image forming apparatus according to claim 4, wherein the second coupling protrusions are spaced apart from one another in a circumferential direction of the coupler.

6. An image forming apparatus comprising:
a first rotator;
a second rotator to apply pressure to the first rotator to define a nip;
a drive unit to drive the first rotator; and
a power transmitting unit to transmit power from the drive unit to the first rotator,
wherein torsional rigidity of the power transmitting unit is greater than about 632 kNm/rad such that a torsion angle variation rate of the first rotator, due to shock applied to the first rotator by a printing medium when the printing medium passes through the nip, becomes less than 2°.

7. The image forming apparatus according to claim 6, wherein the drive unit includes a drive motor, a drive shaft and a driving gear connected to the drive shaft, and
wherein the power transmitting unit includes a driven gear engaged with and rotated by the driving gear, a rotating shaft having one end connected to the driven gear so as be rotated by the driven gear and a coupler having one side coupled to the other end of the rotating shaft and the other side coupled to one end of the first rotator.

8. The image forming apparatus according to claim 7, wherein the coupler has an outer diameter substantially equal to an outer diameter of the first rotator.

9. The image forming apparatus according to claim 8, wherein the photoconductor includes a flange formed at one end thereof so as to be connected to the coupler, and the flange includes a receiving portion for reception of at least a portion of the coupler, the receiving portion being shaped such that a diameter thereof is gradually reduced in an axial direction inward of the photoconductor, and
wherein the coupler includes a coupling portion to be received and coupled in the receiving portion, and the coupling portion is shaped such that a diameter thereof is gradually reduced in a given direction for coupling of the coupler and the photoconductor, so as to correspond to the receiving portion.

10. The image forming apparatus according to claim 7, wherein the coupler has an outer diameter greater than an outer diameter of the first rotator and less than an outer diameter of the driven gear.

11. The image forming apparatus according to claim 10, wherein the flange includes a plurality of first coupling protrusions extending radially outward of the photoconductor and a plurality of first coupling recesses formed between the first coupling protrusions, and
wherein the coupler includes a plurality of second coupling protrusions to be inserted into the first coupling recesses and a plurality of second coupling recesses for reception of the first coupling protrusions.

* * * * *